United States Patent Office 3,086,842
Patented Apr. 23, 1963

3,086,842
FLUORINATION AND OXIDATION OF URANIUM TETRAFLUORIDE TO URANIUM HEXAFLUORIDE BY PERCHLORYL FLUORIDE
William A. La Lande, Jr., Wyndmoor, Pa., assignor to Pennsalt Chemicals Corporation, Philadelphia, Pa., a corporation of Pennsylvania
No Drawing. Filed July 1, 1960, Ser. No. 40,168
3 Claims. (Cl. 23—14.5)

This invention relates to a process for production of uranium hexafluoride ($UF_6$) from uranium tetrafluoride ($UF_4$). More particularly it relates to the simultaneous oxidation and fluorination of uranium tetrafluoride to uranium hexafluoride by means of perchloryl fluoride ($ClO_3F$).

Uranium tetrafluoride is obtained when uranium dioxide is treated with hydrogen fluoride at about 550° C. It is also obtained by treating uranium metal with hydrogen fluoride. Uranium tetrafluoride is a solid and, as such, it is not readily adaptable for chemical manipulations.

Uranium hexafluoride, on the other hand, is a uniquely useful form of uranium. It is particularly important for reactor fuel processing for the reason that it is the only compound of uranium which is volatile at relatively ordinary working temperatures. It is used as feed to the isotope separation process. It is a powerful fluorinating agent.

In view of the wide usefulness of the hexafluoride form of uranium, it is highly desirable to provide economic means for preparing the hexafluoride from the tetrafluoride. The present invention provides such a means.

Previously known methods for the preparation of uranium hexafluoride from uranium tetrafluoride include (a) treatment of the uranium tetrafluoride with oxygen at about 800° C. whereby the uranium is oxidized to the hexavalent state or (b) treatment with fluorine above 250° C., or (c) treatment with cobaltic fluoride at 300–400° C. In the latter two methods, the uranium tetrafluoride is simultaneously oxidized to the higher valence state and fluorinated. See, for example, Katz et al., "The Chemistry of Uranium," Part I, Division VIII, vol. 5, pages 374–376, McGraw-Hill Book Company, Inc., 1951.

The above methods each have certain disadvantages from a practical production standpoint. For example, the use of oxygen involves exceedingly high operating temperatures. The use of fluorine involves use of a highly reactive gas at elevated temperatures. The use of cobaltic fluoride introduces the possibility of contamination of the uranium hexafluoride with cobalt compounds.

The oxidative treatments of uranium tetrafluoride with metal chlorates to form oxides and with perchloric acid to form uranyl fluoride have previously been known. For example, when uranium tetrafluoride is fused with potassium chlorate, the $UF_4$ is converted to the oxide $U_3O_8$. See Katz et al., above, page 376. Dilute perchloric acid dissolves uranium metal smoothly with the aid of oxidizing agents whereas 90% perchloric acid oxidizes the metal very vigorously. (Ibid., page 170.) When uranium tetrafluoride is treated with perchloric acid in solution in each case uranyl fluoride ($UO_2F_2$) is obtained. (Ibid., page 375.)

It has now been found that when uranium tetrafluoride is contacted with perchloryl fluoride at elevated temperatures under anhydrous conditions in the absence of an added source of oxygen, the uranium tetrafluoride unexpectedly is smoothly converted by a combination of fluorination and oxidation reactions to a mixture of uranium hexafluoride and uranyl fluoride according to the following reaction:

$$7UF_4 + 2ClO_3F \rightarrow 4UF_6 + 3UO_2F_2 + Cl_2$$

By means of this invention the combined oxidizing and fluorinating properties of perchloryl fluoride are used to produce uranium hexafluoride and uranyl fluoride by a process which is free of the disadvantages of the prior art methods discussed above. The uranium hexafluoride and chlorine are readily separated as volatile materials from the uranyl fluoride. The chlorine in turn is easily separated from the uranium hexafluoride, which forms a sublimate.

Perchloryl fluoride is a relatively new oxidizing agent. It is a surprisingly stable fluorine derivative of perchloric acid and is distinguished by its chemical inertness at ordinary temperatures. A. Engelbrecht and E. Atzwanger, Monatsh., 83, 1087 (1952), and J. Inorg. Nuclear Chemistry, 2, 348–57 (1956). Perchloryl fluoride is commercially available. It can be prepared by electrolysis of sodium perchlorate in anhydrous hydrofluoric acid as described in the Engelbrecht et al. references cited above. It can also be made by treatment of an inorganic perchlorate with fluosulfonic acid as disclosed and claimed in my copending application Serial No. 19,145, filed April 1, 1960.

In carrying out the process of this invention, uranium tetrafluoride, preferably in finely divided form, is intimately contacted with perchloryl fluoride under anhydrous conditions in a corrosion-resistant metal reactor vessel, preferably nickel or one of its alloys, at a temperature above about 250° C., and preferably in the range of about 300–500° C. The perchloryl fluoride is in gaseous form and the uranium hexafluoride is in sublimate form at the temperature of the reaction; accordingly, the lower end of the temperature range is preferred for most efficient thermodynamic operation of the process.

Pressure is not critical, and the reaction may be conducted at atmospheric pressure, sub-atmospheric pressure, or superatmospheric pressure. A slightly elevated pressure is most convenient and is preferred in order to exclude moisture from the system. Uranium hexafluoride is highly reactive with water and forms a complex of uranyl fluoride, hydrogen fluoride and water. Therefore, the reactor system, the reactants and the product recovery system must all be maintained in an anhydrous condition so that a maximum yield of uranium hexafluoride can be recovered.

The uranium tetrafluoride and perchloryl fluoride are brought into contact by passing the gaseous perchloryl fluoride over the surface of the solid uranium compound. The process can be carried out by using a thin layer of the uranium tetrafluoride in finely divided form and passing the perchloryl fluoride over the layer. The process is preferably carried out by using a fluidized bed of the uranium tetrafluoride and passing the perchloryl fluoride through it.

The stoichiometric reaction between uranium tetrafluoride and perchloryl fluoride requires the use of at least two moles of the latter to seven moles of the former. The reaction between the two materials proceeds rapidly and smoothly to completion. The reaction rate is readily controlled by adjusting the quantity of perchloryl fluoride which is brought into contact with the uranium tetrafluoride per unit of time and mass. Unreacted perchloryl fluoride can be readily separated by distillation from the products and can be recycled to the reactor.

Uranium hexafluoride is recovered from the reaction mass as a sublimate which is then cooled and removed from the recovery system. Preferably, a cold surface is provided on which the sublimate is collected and from which it can be resublimed to purify it further. Anhydrous conditions must be maintained at all times to avoid hydrolysis of the uranium hexafluoride. Exposure to the atmosphere therefore must be avoided.

The chlorine by-product, after separation from the uranium hexafluoride, can be recovered in substantially pure form, or it can be treated with an alkali and wasted.

Uranyl fluoride is obtained as a solid by-product residue in the reactor vessel. The uranyl fluoride can be recovered in such form, or it can be treated with elemental fluorine to convert it to uranium hexafluoride by a known method. See, for example, the process depicted by the equation $$2F_2 + UO_2F_2 = UF_6 + O_2 \text{ (as fluorinoxide)}$$

disclosed and claimed in U.S. Patent 2,761,756, issued September 4, 1956, to Homer F. Priest. The present invention therefore provides a means whereby substantially all of the uranium tetrafluoride charged to the reactor vessel can be converted to uranium hexafluoride by treating the uranium tetrafluoride in the reactor vessel first with perchloryl fluoride according to the novel process described here and then treating the residual uranyl fluoride in the vessel with fluorine. The perchloryl fluoride and fluorine also can be used together in a mixture containing about three moles of fluorine to one of perchloryl fluoride according to the following reaction:

$$7UF_4 + 2ClO_3F + 6F_2 = 7UF_6 + Cl_2 + 3O_2 \text{ (as fluorinoxide)}$$

The presence of the perchloryl fluoride has a moderating effect on the fluorine and makes the mixture less difficult to use than fluorine alone. The uranium tetrafluoride can thus be reacted with the $ClO_3F$—$F_2$ mixture and substantially all converted to uranium hexafluoride under anhydrous conditions at a temperature in the ranges disclosed above, e.g., 300°–500° C. It is to be noted that by means of this invention a net saving of one mole of fluorine is achieved over the prior art method based on the use of fluorine alone.

The following examples, which are by way of illustration and not of limitation, further describe the practice and usefulness of this invention.

*Example 1*

Ten parts of $UF_4$ were placed in a nickel combustion boat. The boat was then inserted into an electrically heated iron tube having one end fitted with an inlet for admission of gaseous perchloryl fluoride and the other end fitted to a corrosion resistant outlet manifold system made of copper fittings and polytrifluorochloroethylene tubing. The latter tubing was connected to the inlet of a glass cold-finger trap set in ice. The outlet of the trap was connected to a vacuum system. The entire system was then evacuated. The temperature of the tube containing the $UF_4$ was raised to about 400° C. while evacuation was continued to remove traces of moisture. Perchloryl fluoride gas was then passed through a trap containing phosphorus pentoxide and into the system to the $UF_4$ in the boat. The color of the $UF_4$ changed from green to white within about 10 minutes. The flow of $ClO_3F$ was continued for about three hours. White crystals collected in the cold trap. The crystals sublimed at about 59–65° C. at atmospheric pressure. Upon exposure to air they fumed strongly. On contact with water they reacted violently and liberated hydrogen fluoride. The white crystalline product was thus confirmed to be $UF_6$. A solid material weighing 4.46 parts remained in the boat in the tube. This solid material was identified as uranyl fluoride by analysis for fluorine content and by X-ray diffraction. The stoichiometric relationships of the reactants and products were found to correspond to those in the following equation:

$$7UF_4 + 2ClO_3F \rightarrow 4UF_6 + 3UO_2F_2 + Cl_2$$

*Example 2*

Using the same apparatus and general procedure as in Example 1, $UF_4$ was treated with $ClO_3F$ at about 300° C. The $UF_4$ was observed to turn rapidly from green to white. White crystals collected in the cold trap as in Example 1. A white solid remained in the boat. It was identified as $UO_2F_2$ by fluorine content analysis.

*Example 3*

Using the same apparatus and general procedures as in Example 1, 10 parts of $UF_4$ were heated at 500° C. in the presence of dry oxygen gas for 4 hours. No solids were found to collect in the cold trap. The color of the $UF_4$ remained unchanged. The $UF_4$ weight loss amounted to about 0.5 part. On carrying out the same reaction at 800° C., the results obtained were similar to those obtained in Example 1 with $ClO_3F$ and $UF_4$. For example, 10 parts of $UF_4$ heated in dry $O_2$ for 1 hour at 800° C. left about 4.7 parts of $UO_2F_2$ as residue, corresponding to the stoichiometric relationships in the following equation:

$$2UF_4 + O_2 \rightarrow UO_2F_2 + UF_6$$

By comparing the results and operating conditions of Example 3 with those of Examples 1 and 2, it is seen in Examples 1 and 2 that 2 moles of $ClO_3F$ react with 7 of $UF_4$ to convert four-sevenths (about 57%) of the molar quantity of $UF_4$ to $UF_6$, forming 2 moles of $UF_6$ per mole of $ClO_3F$. In contrast in Example 3 oxygen converts only 50% of the uranium tetrafluoride to uranium hexafluoride and forms only 1 mole of the latter per mole of $O_2$. Furthermore, the conversion of $UF_4$ to both $UF_6$ and $UO_2F_2$ with perchloryl fluoride is carried out at a much lower working temperature, i.e., about 400°–500° C. lower than that necessary when oxygen is used as the oxidizing agent.

*Example 4*

Using the same apparatus as in Example 1 without the phosphorus pentoxide trap, fluorine gas is passed over the residue of uranyl fluoride from Example 1 at a temperature of about 350° C. until the uranyl fluoride is substantially all converted to uranium hexafluoride according to the following reaction:

$$2F_2 + UO_2F_2 \rightarrow UF_6 + O_2 \text{ (as fluorinoxide)}$$

The uranium hexafluoride is collected as a crystalline sublimate in the cold-trap, as in the preceding examples.

*Example 5*

Using the same apparatus as in Example 1 without the phosphorus pentoxide trap, a mixture consisting of pre-dried perchloryl fluoride with fluorine in the molar ratio of 1:3 of the former to the latter is passed over uranium tetrafluoride in the boat at a temperature of about 350° C. until the uranium tetrafluoride is substantially all converted to uranium hexafluoride. The uranium hexafluoride is collected as a sublimate in the cold trap.

Many different embodiments of this invention can be made without departing from its spirit and scope, and it is to be understood that this invention includes also such embodiments and is not limited by the above description.

I claim:

1. A process for preparing uranium hexafluoride which comprises heating uranium tetrafluoride in the presence of perchloryl fluoride at a temperature above about 250° C. under anhydrous conditions in the absence of an added source of oxygen and recovering uranium hexafluoride as a product from the reaction mass.

2. A process for preparing uranium hexafluoride comprising the steps of heating uranium tetrafluoride at a temperature above about 250° C. and under anhydrous conditions in the absence of an added source of oxygen first with perchloryl fluoride to convert part of the uranium tetrafluoride to uranium hexafluoride and substantially all of the remainder to uranyl fluoride, reacting the uranyl fluoride with fluorine to form uranium and recovering uranium hexafluoride as a product from the reaction mass.

3. A process for preparing uranium hexafluoride comprising heating uranium tetrafluoride at a temperature above about 250° C. under anhydrous conditions in the absence of an added source of oxygen with a mixture consisting of perchloryl fluoride and fluorine in the molar ratio of about 1:3 and recovering uranium hexafluoride as a product from the reaction mass.

References Cited in the file of this patent
UNITED STATES PATENTS

| | | |
|---|---|---|
| 2,535,572 | Hainer | Dec. 26, 1950 |
| 2,761,756 | Priest | Sept. 4, 1956 |
| 2,811,413 | McMillan | Oct. 29, 1957 |
| 2,830,873 | Katz | Apr. 15, 1958 |

OTHER REFERENCES

Katz et al.: "Chemistry of Uranium," pp. 170, 375, 376 (1951), McGraw-Hill Book Co., Inc., N.Y.C.

AEC Document K-849, pp. 8, 11-25, 29, 32, 34, 35, Dec. 18, 1953.

UNITED STATES PATENT OFFICE

CERTIFICATE OF CORRECTION

Patent No.3,086,842　　　　　　　　　　　　　　　April 23, 1963

William A. La Lande, Jr.

It is hereby certified that error appears in the above numbered patent requiring correction and that the said Letters Patent should read as corrected below.

Column 5, line 3, after "uranium" insert -- hexafluoride --.

Signed and sealed this 12th day of November 1963.

(SEAL)
Attest:

ERNEST W. SWIDER　　　　　　　　　　　　　　　　EDWIN L. REYNOLDS

Attesting Officer　　　　　　　　　　　　　Acting　Commissioner of Patents